United States Patent
Tamaru et al.

(10) Patent No.: US 11,955,593 B2
(45) Date of Patent: Apr. 9, 2024

(54) POWER STORAGE MODULE AND METHOD FOR MANUFACTURING POWER STORAGE MODULE

(71) Applicant: KABUSHIKI KAISHA TOYOTA JIDOSHOKKI, Kariya (JP)

(72) Inventors: Kojiro Tamaru, Kariya (JP); Takafumi Yamasaki, Kariya (JP); Hiromi Ueda, Kariya (JP); Tsuyoshi Mariya, Kariya (JP); Masahiro Yamada, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 895 days.

(21) Appl. No.: 16/963,376

(22) PCT Filed: Jan. 28, 2019

(86) PCT No.: PCT/JP2019/002790
§ 371 (c)(1),
(2) Date: Jul. 20, 2020

(87) PCT Pub. No.: WO2019/151193
PCT Pub. Date: Aug. 8, 2019

(65) Prior Publication Data
US 2020/0358050 A1    Nov. 12, 2020

(30) Foreign Application Priority Data

Jan. 30, 2018 (JP) .................. 2018-013315
Mar. 28, 2018 (JP) .................. 2018-062090

(51) Int. Cl.
*H01M 10/04* (2006.01)
*H01G 11/12* (2013.01)
(Continued)

(52) U.S. Cl.
CPC ........ *H01M 10/0418* (2013.01); *H01G 11/12* (2013.01); *H01G 11/80* (2013.01);
(Continued)

(58) Field of Classification Search
None
See application file for complete search history.

(56) References Cited

FOREIGN PATENT DOCUMENTS

| JP | 2005-259379 A | 9/2005 |
|---|---|---|
| JP | 2008-226782 A | 9/2008 |

(Continued)

OTHER PUBLICATIONS www.espacenet.com machine translation of WO 2018074135A1. (Year: 2018).*

(Continued)

*Primary Examiner* — Gregg Cantelmo
(74) *Attorney, Agent, or Firm* — Sughrue Mion, PLLC

(57) ABSTRACT

A power storage module includes an electrode laminate including a plurality of bipolar electrodes which are laminated and a sealing body sealing a space between a pair of the bipolar electrodes adjacent to each other in a laminating direction among the plurality of bipolar electrodes in the electrode laminate. Each of the plurality of bipolar electrodes includes an electrode plate. The sealing body includes a group of primary sealing bodies each provided at an edge portion of the electrode plate and a secondary sealing body. The secondary sealing body includes a first resin portion that is provided along a side surface of the electrode laminate extending in the laminating direction and bonds the group of primary sealing bodies, and a second resin portion covering the first resin portion.

12 Claims, 12 Drawing Sheets

(51) Int. Cl.
   *H01G 11/80*     (2013.01)
   *H01G 11/84*     (2013.01)
   *H01M 10/0585*   (2010.01)
   *H01M 50/186*    (2021.01)
   *H01M 50/193*    (2021.01)

(52) U.S. Cl.
   CPC ............ *H01G 11/84* (2013.01); *H01M 10/04* (2013.01); *H01M 10/0585* (2013.01); *H01M 50/186* (2021.01); *H01M 50/193* (2021.01)

(56) References Cited

FOREIGN PATENT DOCUMENTS

| JP | 2011-204386 A | 10/2011 | | |
|---|---|---|---|---|
| WO | WO-2018074135 A1 | * | 4/2018 | ............ H01G 11/10 |
| WO | WO-2018116729 A1 | * | 6/2018 | ............ H01G 11/26 |

OTHER PUBLICATIONS

International Preliminary Report on Patentability with translation of Written Opinion dated Aug. 4, 2020, in International Application No. PCT/JP2019/002790.

* cited by examiner

POWER STORAGE MODULE AND METHOD FOR MANUFACTURING POWER STORAGE MODULE

CROSS REFERENCE TO RELATED APPLICATIONS

This application is a National Stage of International Application No. PCT/JP2019/002790 filed Jan. 28, 2019, claiming priority based on Japanese Patent Application No. 2018-013315 filed Jan. 30, 2018 and Japanese Patent Application No. 2018-062090 filed Mar. 28, 2018.

TECHNICAL FIELD

One aspect of the present invention relates to a power storage module and a method for manufacturing a power storage module.

BACKGROUND ART

As a power storage module of the related art, a so-called bipolar-type power storage module including a bipolar electrode in which a positive electrode is formed on one surface of an electrode plate and a negative electrode is formed on the other surface is known (refer to Patent Literature 1). Such a power storage module includes an electrode laminate formed by laminating a plurality of bipolar electrodes. In the circumference of the electrode laminate, a sealing body that seals portions between the bipolar electrodes adjacent to each other in the laminating direction is provided. In internal spaces formed by the sealing body between the bipolar electrodes, an electrolytic solution is accommodated.

CITATION LIST

Patent Literature

[Patent Literature 1] Japanese Unexamined Patent Publication No. 2011-204386

SUMMARY OF INVENTION

Technical Problem

In the formation of the above-described sealing body, for example, a primary sealing body is disposed at an edge portion of the electrode plate configuring the bipolar electrode, and the primary sealing body-attached bipolar electrodes are laminated together to form the electrode laminate. After that, the primary sealing bodies of the respective bipolar electrodes are bonded to each other using a secondary sealing body, thereby forming the sealing body. The secondary sealing body is formed by, for example, the injection molding of a resin. The secondary sealing body configures an outer wall of the power storage module and is thus formed thick for strength improvement. Therefore, the cooling rate of the resin after the injection molding is uneven. The resin shrinks by cooling, and thus voids (holes) may be formed in the interface, between the primary sealing body and the secondary sealing body, which is not easily cooled. In this case, there is a concern that the primary sealing bodies may not be bonded to each other by the secondary sealing body and a sealing property by the sealing body between the bipolar electrodes may degrade.

One aspect of the present invention has been made to solve the above-described problem and provides a power storage module capable of improving a sealing property and a method for manufacturing a power storage module.

Solution to Problem

A power storage module according to one aspect of the present invention includes an electrode laminate including a plurality of laminated bipolar electrodes; and a sealing body sealing a space between a pair of the bipolar electrodes adjacent to each other in a laminating direction among the plurality of bipolar electrodes in the electrode laminate. Each of the plurality of bipolar electrodes includes an electrode plate. The sealing body includes a group of primary sealing bodies each provided at an edge portion of the electrode plate and a secondary sealing body. The secondary sealing body includes a first resin portion that is provided along a side surface of the electrode laminate extending in the laminating direction and bonds the group of primary sealing bodies, and a second resin portion covering the first resin portion.

In this power storage module, the secondary sealing body includes not only the first resin portion bonding the group of primary sealing bodies but also the second resin portion. Therefore, it is possible to thin the thickness of the first resin portion while ensuring the strength of the secondary sealing body. This prevents unevenness in cooling rate after a resin forming the first resin portion has been injection molded. As a result, the formation of voids in the interface between the primary sealing body and the first resin portion is prevented, and thus it is possible to bond the primary sealing bodies to each other by the first resin portion. Therefore, it is possible to improve the sealing property.

The first resin portion may include a first side surface part that is provided along the side surface and bonds the group of primary sealing bodies, and a first overhang part overhanging one end surface of the electrode laminate in the laminating direction from the first side surface part. The second resin portion may include a second side surface part provided along the first side surface part and a second overhang part overhanging the other end surface of the electrode laminate in the laminating direction from the second side surface part. In this case, when the first resin portion is formed by, for example, injection molding, a mold is pressed against all of the other end surface of the electrode laminate and all but the edge portion of the one end surface. Furthermore, the resin is injected into the inside of the mold from the one end surface side, and a resin flow is pressed against the edge portion of the one end surface. In such a case, it is possible to impart a compressive force in the laminating direction to the edge portion of the electrode laminate. Therefore, the bipolar electrodes being lifted up by the resin flow is prevented. As a result, it is possible to further improve the sealing property.

A length of the first overhang part in the laminating direction may be set to be longer than a length of the second overhang part in the laminating direction. In this case, for example, in a mold for injection molding, it is possible to set the length in the laminating direction of a space for forming the first overhang part to be longer than the length in the laminating direction of a space for forming the second overhang part. At the time of the injection molding of the first resin portion, it is possible to impart a compressive force in the laminating direction to the electrode laminate using the mold. However, it is not possible to impart a compressive force to the edge portion of the electrode laminate at which the first resin portion is provided. Therefore, there is a concern that the edge portion of the electrode laminate may not be compressed and may intrude into the space for forming the first overhang part and the space may be narrowed. When the space is narrowed, there is a concern that the resin may not be delivered to the inside of the mold and the first resin portion may be poorly formed. In the power storage module according to the aspect of the present invention, the length in the laminating direction of the space can be set to be long, and thus it is possible to inhibit the poor formation of the first resin portion.

The second resin portion may include a side surface part provided along the first resin portion, a first overhang part overhanging one end surface of the electrode laminate in the laminating direction from the side surface part, and a second overhang part overhanging the other end surface of the electrode laminate in the laminating direction from the side surface part is formed. In this case, at the time of forming the first resin portion, it is possible to injection-mold the resin in a state in which the mold is pressed against, for example, the one end surface and the other end surface and a compressive force in the laminating direction is imparted to the edge portion of the electrode laminate. Therefore, the bipolar electrodes being lifted up by the resin flow is prevented. As a result, it is possible to further improve the sealing property.

A resin forming the first resin portion may be the same as a resin forming the second resin portion. In this case, the first resin portion and the second resin portion are easily bonded to each other, and thus it is possible to improve the strength of the sealing body.

A method for manufacturing a power storage module according to one aspect of the present invention includes an electrode laminate-forming step of forming an electrode laminate by laminating bipolar electrodes each provided with a primary sealing body at an edge portion and a secondary sealing body-forming step of forming a secondary sealing body bonding a group of the primary sealing bodies by injection molding of a resin. The secondary sealing body-forming step includes a first resin portion-forming step of forming a first resin portion bonding the group of the primary sealing bodies along a side surface extending in a laminating direction of the electrode laminate and a second resin portion-forming step of forming a second resin portion covering the first resin portion.

In this method for manufacturing a power storage module, in the secondary sealing body-forming step, the first resin portion bonding the group of the primary sealing bodies is formed along the side surface of the electrode laminate, and the second resin portion is also formed. Therefore, it is possible to thin the thickness of the first resin portion while ensuring the strength of the secondary sealing body. This prevents unevenness in cooling rate after a resin forming the first resin portion has been injection molded. As a result, voids in the interface between the primary sealing body and the first resin portion is prevented, and it is possible to bond the primary sealing bodies to each other by the first resin portion. Therefore, it is possible to improve the sealing property.

In the first resin portion-forming step, a first side surface part may be formed along the side surface, and a first overhang part overhanging one end surface of the electrode laminate in the laminating direction from the first side surface part may be formed. In the second resin portion-forming step, a second side surface part may be formed along the first side surface part, and a second overhang part overhanging the other end surface of the electrode laminate in the laminating direction from the second side surface part may be formed. In this case, in the first resin portion-forming step, a mold is pressed against, for example, all of the other end surface and all but the edge portion of the one end surface. Furthermore, the resin is injected into the inside of the mold from the one end surface side, and a resin flow is pressed against the edge portion of the one end surface. In such a case, it is possible to impart a compressive force in the laminating direction to the edge portion of the electrode laminate. Therefore, the bipolar electrodes being lifted up by the resin flow is prevented. As a result, it is possible to further improve the sealing property.

In the second resin portion-forming step, a side surface part may be formed along the first resin portion, and a first overhang part overhanging one end surface of the electrode laminate in the laminating direction from the side surface part and a second overhang part overhanging the other end surface of the electrode laminate in the laminating direction from the side surface part may be formed. In this case, in the second resin portion-forming step, it is possible to injection-mold the resin in a state in which the mold is pressed against, for example, all of the one end surface and the other end surface and a compressive force in the laminating direction is imparted to the edge portion of the electrode laminate. Therefore, the bipolar electrodes being lifted up by the resin flow is prevented. As a result, it is possible to further improve the sealing property.

Advantageous Effects of Invention

According to one aspect of the present invention, a power storage module capable of improving a sealing property and a method for manufacturing a power storage module are provided.

DESCRIPTION OF EMBODIMENTS

Figure 1:
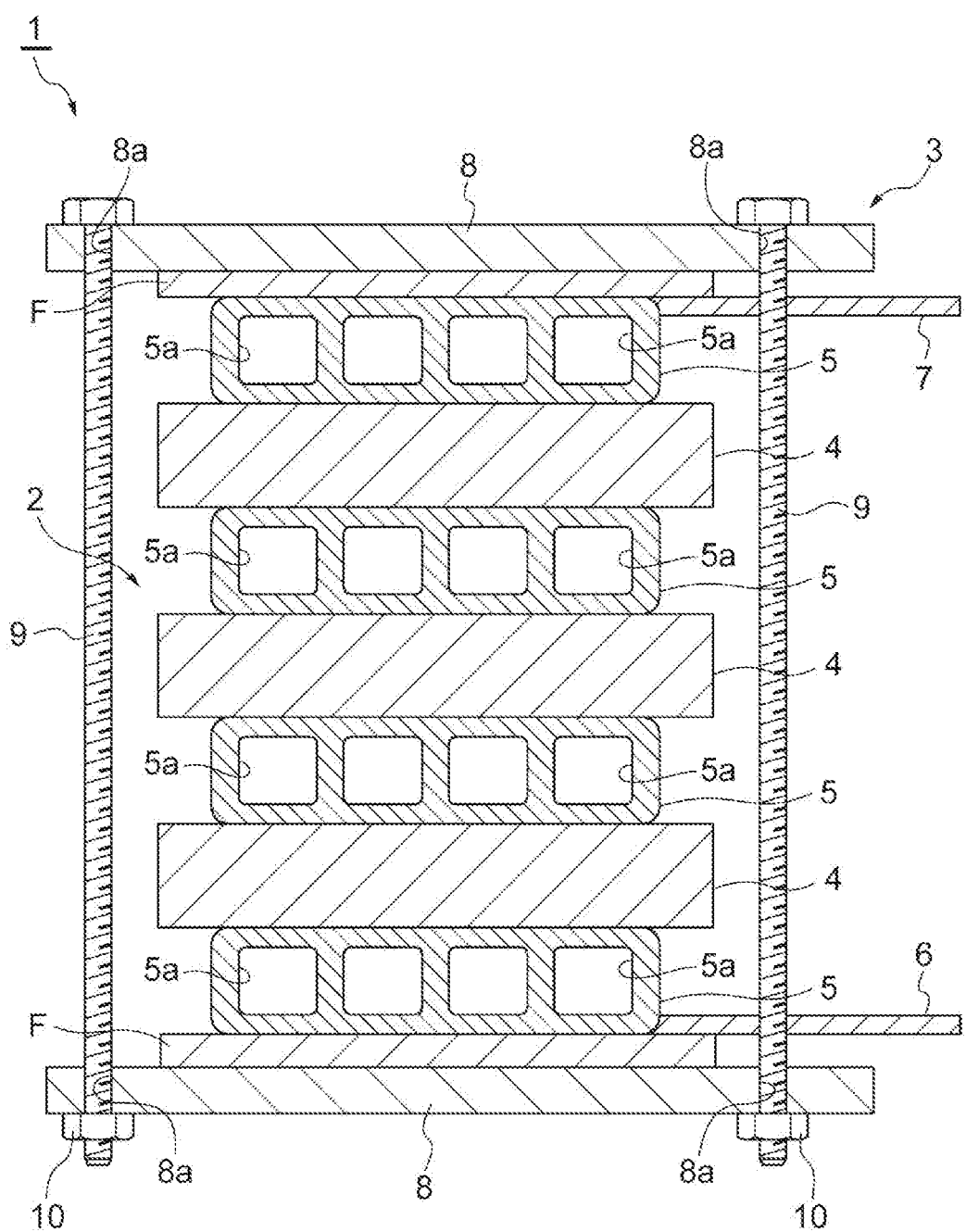
FIG. 1 is a schematic sectional view showing a power storage device according to an embodiment.

Hereinafter, the details of an embodiment will be described with reference to the accompanying drawings. In the description, the same components or components having the same functions will be represented by the same reference numerals, and the description thereof will not be repeated.

FIG. 1 is a schematic sectional view showing a power storage device according to the embodiment. A power storage device 1 shown FIG. 1 is used as batteries of various vehicles, for example, a forklift, a hybrid vehicle, an electric vehicle, and the like. The power storage device 1 includes a power storage module laminate 2 including a plurality of laminated power storage modules 4 and a restraining member 3 that applies a restraining load to the power storage module laminate 2 in a laminating direction.

The power storage module laminate 2 includes a plurality of (three in the present embodiment) power storage modules 4 and a plurality of (four in the present embodiment) conductive plates 5. The power storage module 4 is, for example, a bipolar battery including bipolar electrodes 14 described below and has a rectangular shape when seen in the laminating direction. The power storage module 4 is, for example, a secondary battery such as a nickel metal hybrid secondary battery or a lithium ion secondary battery or an electric double layer capacitor. In the following description, a nickel metal hybrid secondary battery will be exemplified.

The power storage modules 4 and 4 adjacent to each other in the laminating direction are electrically connected to each other through the conductive plate 5. The conductive plates 5 are disposed between the power storage modules 4 and 4 adjacent to each other in the laminating direction and on the outer side of the power storage modules 4 positioned at laminate ends, respectively. A positive electrode terminal 6 is connected to one conductive plate 5 that is disposed on the outer side of the power storage module 4 positioned at one laminate end. A negative electrode terminal 7 is connected to the other conductive plate 5 disposed on the outer side of the power storage module 4 positioned at the other laminate end. The positive electrode terminal 6 and the negative electrode terminal 7 are drawn, for example, in a direction intersecting the laminating direction from the edge portions of the conductive plates 5. The power storage device 1 is charged and discharged by the positive electrode terminal 6 and the negative electrode terminal 7.

In each of the conductive plates 5, a plurality of flow paths 5a through which a coolant such as an air is circulated is provided. The respective flow paths 5a extend in parallel with each other in a direction, for example, respectively perpendicular to the laminating direction and the drawing direction of the positive electrode terminal 6 and the negative electrode terminal 7. When the coolant is circulated through these flow paths 5a, the conductive plate 5 has a function as a connection member that electrically connects the power storage modules 4 and 4 and a function as a heat dissipation plate that dissipates heat generated from the power storage module 4. In the example of FIG. 1, the area of the conductive plate 5 is smaller than the area of the power storage module 4 when seen in the laminating direction; however, from the viewpoint of improving a heat dissipation property, the area of the conductive plate 5 may be equal to the area of the power storage module 4 or may be larger than the area of the power storage module 4.

The restraining member 3 includes a pair of end plates 8 and 8 that interpose the power storage module laminate 2 in the laminating direction and fastening bolts 9 and nuts 10 that fasten the end plates 8 and 8. The end plate 8 is a rectangular metal plate having an area slightly larger than the areas of the power storage module 4 and the conductive plate 5 when seen in the laminating direction. An electrically insulating film F is provided on an inner surface (surface on the power storage module laminate 2 side) of the end plate 8. The film F insulates the end plate 8 and the conductive plate 5.

In an edge portion of the end plate 8, an insertion hole 8a is provided at a position on the outside of the power storage module laminate 2. The fastening bolt 9 is passed from the insertion hole 8a of one end plate 8 toward the insertion hole 8a of the other end plate 8, and the nut 10 is screwed to a distal end portion of the fastening bolt 9 protruding from the insertion hole 8a of the other end plate 8. As a result, the power storage modules 4 and the conductive plates 5 are interposed between the end plates 8 and 8 to form a unit as the power storage module laminate 2, and a restraining load is applied to the power storage module laminate 2 in the laminating direction.

Figure 2:
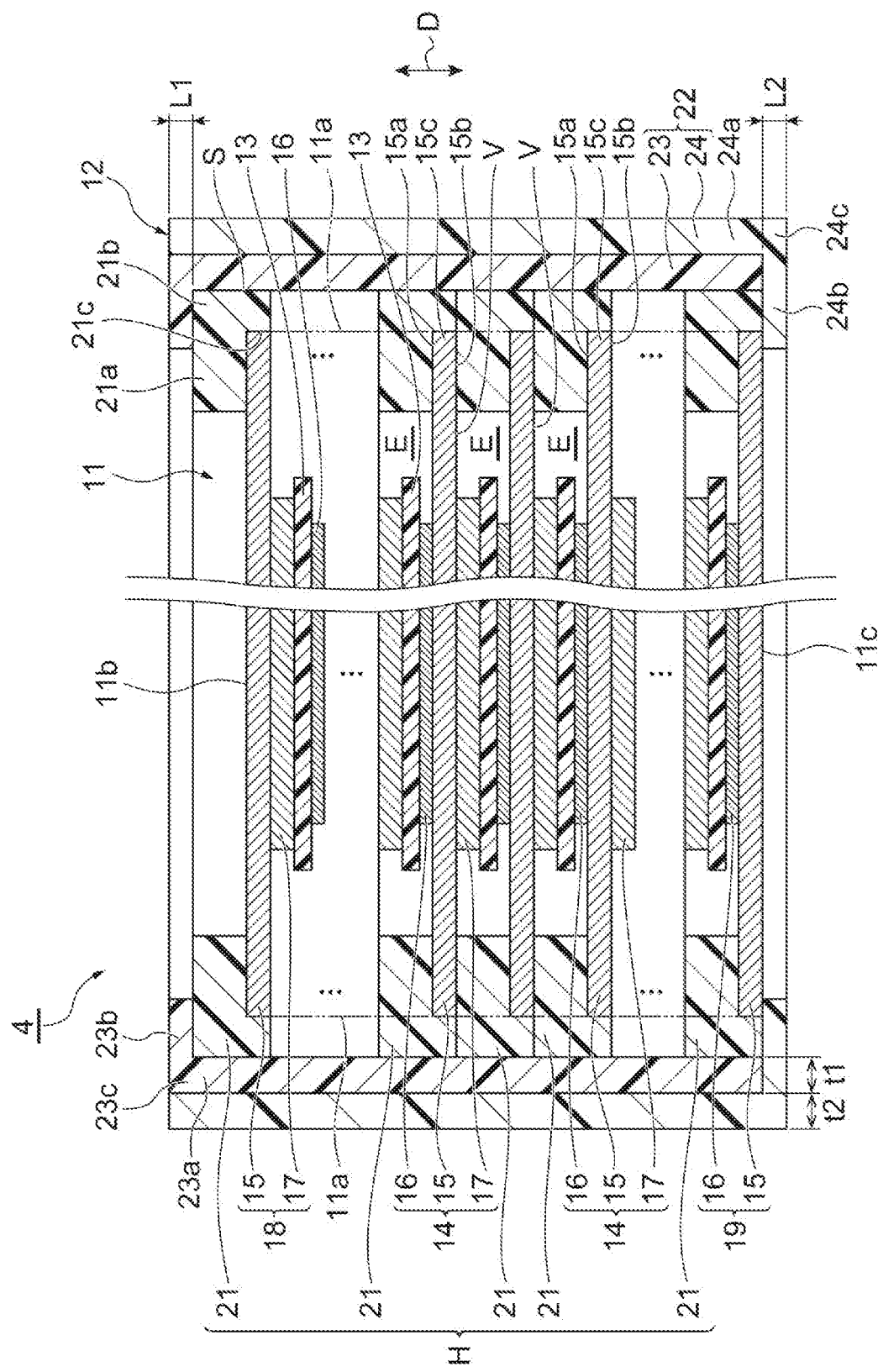
FIG. 2 is a schematic sectional view of a power storage module shown in FIG. 1.

Next, a configuration of the power storage module 4 will be described in more detail. FIG. 2 is a schematic sectional view of the power storage module shown in FIG. 1. As shown in FIG. 2, the power storage module 4 includes an electrode laminate 11 and a sealing body 12.

The electrode laminate 11 is configured by laminating a plurality of bipolar electrodes 14 with a separator 13 therebetween. That is, the electrode laminate 11 includes a plurality of laminated bipolar electrodes 14. In the present embodiment, a laminating direction D of the electrode laminate 11 matches the laminating direction of the power storage module laminate 2 (refer to FIG. 1). The electrode laminate 11 includes a side surface 11a extending in the laminating direction D and end surfaces 11b and 11c in the laminating direction D. The bipolar electrode 14 includes an electrode plate 15, a positive electrode 16 provided on a first surface 15a of the electrode plate 15, and a negative electrode 17 provided on a second surface 15b of the electrode plate 15.

The positive electrode 16 is a positive electrode active material layer formed by applying a positive electrode active material. The negative electrode 17 is a negative electrode active material layer formed by applying a negative electrode active material. In the electrode laminate 11, the positive electrode 16 of one bipolar electrode 14 faces the negative electrode 17 of the bipolar electrode 14 adjacent thereto on one side in the laminating direction D with the separator 13 therebetween. In the electrode laminate 11, the negative electrode 17 of one bipolar electrode 14 faces the positive electrode 16 of the bipolar electrode 14 adjacent thereto on the other side in the laminating direction D with the separator 13 therebetween.

A negative electrode terminal electrode 18 is disposed at one end of the electrode laminate 11 in the laminating direction D, and a positive electrode terminal electrode 19 is disposed at the other end in the laminating direction D. The negative electrode terminal electrode 18 includes the electrode plate 15 and the negative electrode 17 provided on the second surface 15b of the electrode plate 15. The negative electrode 17 of the negative electrode terminal electrode 18 faces the positive electrode 16 of the bipolar electrode 14 with the separator 13 therebetween. One conductive plate 5 adjacent to the power storage module 4 is in contact with the first surface 15a of the electrode plate 15 of the negative electrode terminal electrode 18. The positive electrode terminal electrode 19 includes the electrode plate 15 and the positive electrode 16 provided on the first surface 15a of the electrode plate 15. The other conductive plate 5 adjacent to the power storage module 4 is in contact with the second surface 15b of the electrode plate 15 of the positive electrode terminal electrode 19. The positive electrode 16 of the positive electrode terminal electrode 19 faces the negative electrode 17 of the bipolar electrode 14 with the separator 13 therebetween.

The electrode plate 15 is formed of for example, a metal foil formed of a nickel or nickel-plated steel plate. When seen in the laminating direction D, the electrode plate 15 has, for example, a rectangular shape. In the present embodiment, the electrode plate 15 has an oblong shape when seen in the laminating direction D. An edge portion 15c is a non-applied region to which the positive electrode active material and the negative electrode active material are not applied. Examples of the positive electrode active material forming the positive electrode 16 include nickel hydroxide. Examples of the negative electrode active material forming the negative electrode 17 include a hydrogen storage alloy. In the present embodiment, a region where the negative electrode 17 is formed on the second surface 15b of the electrode plate 15 is slightly larger than a region where the positive electrode 16 is formed on the first surface 15a of the electrode plate 15.

The separator 13 is formed, for example, in a sheet shape. Examples of the separator 13 include a porous film formed of a polyolefin-based resin such as polyethylene (PE) or polypropylene (PP), fabric or non-woven fabric formed of polypropylene, polyethylene terephthalate (PET), methyl cellulose, or the like, and the like. The separator 13 may be a separator reinforced with a vinylidene fluoride resin compound. A shape of the separator 13 is not limited to a sheet shape, and a separator having a bag shape may be used.

The sealing body 12 surrounds the electrode laminate 11. The sealing body 12 seals a space between the bipolar electrodes 14 and 14 adjacent to each other in the laminating direction D among the plurality of bipolar electrodes 14 in the electrode laminate 11. The sealing body 12 is formed in a rectangular cylindrical shape using, for example, an insulating resin. The sealing body 12 includes a group H of primary sealing bodies 21 respectively provided at the edge portions 15c of the electrode plates 15 configuring the bipolar electrodes 14, the negative electrode terminal electrode 18, and the positive electrode terminal electrode 19 and a secondary sealing body 22. A resin forming the primary sealing body 21 is a resin compatible with a resin forming the secondary sealing body 22 and is, for example, the same as the resin forming the secondary sealing body 22. Examples of the resin forming the primary sealing body 21 and the secondary sealing body include polypropylene (PP), polyphenylene sulfide (PPS), modified polyphenylene ether (modified PPE), and the like.

The primary sealing body 21 is provided at the edge portion 15c. The primary sealing body 21 is continuously provided throughout the entire side of the electrode plate 15 in the edge portion 15c (non-applied region) on the first surface 15a side of the electrode plate 15. The primary sealing body 21 is provided apart from the positive electrode 16 and the negative electrode 17 when seen in the laminating direction D. The primary sealing bodies 21 and 21 adjacent to each other in the laminating direction D are in contact with each other. The primary sealing body 21 has a function as a spacer between the electrode plates 15 and 15 of the bipolar electrodes 14 and 14 adjacent to each other in the laminating direction D.

The primary sealing body 21 includes a first part 21a overlapping the edge portion 15c of the electrode plate 15 and a second part 21b projecting outside the edge of the electrode plate 15 when seen in the laminating direction D. The length of the second part 21b in the laminating direction D is longer than the length of the first part 21a in the laminating direction D. Therefore, the primary sealing body 21 includes a riser surface 21c between the first part 21a and the second part 21b. The riser surface 21c covers apart of the end surface of the electrode plate 15, that is, the side surface 11a.

At least a part of the first part 21a is strongly bonded to the edge portion 15c by, for example, welding using ultrasonic waves or heat. In the bonding of the primary sealing body 21 and the electrode plate 15, the bonding surface of the electrode plate 15 with the primary sealing body 21 is a roughening-plated surface provided with a plurality of fine protrusions. In the present embodiment, the entire surface of the first surface 15a of the electrode plate 15 provided with the positive electrode 16 is a roughening-plated surface. The fine protrusion is a protrusion-like metallic deposit (including an imparted substance) formed by electroplating on the electrode plate 15. On the roughening-plated surface, the resin material forming the primary sealing body 21 enters gaps between the fine protrusions, whereby an anchor effect is generated, and the bonding strength and the liquid tightness (sealing property) between the electrode plate 15 and the primary sealing body 21 improve.

The secondary sealing body 22 surrounds the group H of the primary sealing bodies 21 from the outside and configures an outer wall (housing) of the power storage module 4. The secondary sealing body 22 is provided along the side surface 11a and includes a first resin portion 23 that bonds the group H of the primary sealing bodies 21 and a second resin portion 24 that covers the first resin portion 23. A resin forming the first resin portion 23 is a resin compatible with a resin forming the second resin portion 24 and is, for example, the same as the resin forming the second resin portion 24.

The first resin portion 23 includes a side surface part 23a (first side surface part) and an overhang part 23b (first overhang part). The side surface part 23a is provided along the side surface 11a of the electrode laminate 11 and bonds the group H of the primary sealing bodies 21. The overhang part 23b overhangs the end surface 11b from an end portion 23c of the side surface part 23a in the laminating direction D. The overhang part 23b is continuously provided throughout the entire side of the electrode plate 15.

The second resin portion 24 includes a side surface part 24a (second side surface part) and an overhang part 24b (second overhang part). The side surface part 24a is provided along the side surface part 23a and covers the side surface part 23a. A thickness t2 of the side surface part 24a is, for example, equal to a thickness t1 of the side surface part 23a. The thickness t1 is, for example, 3 mm or less. The overhang part 24b overhangs the end surface 11c from an end portion 24c of the side surface part 24a in the laminating direction D. The overhang part 24b is continuously provided throughout the entire side of the electrode plate 15.

A length L1 of the overhang part 23b in the laminating direction D is, for example, longer than a length L2 of the overhang part 24b in the laminating direction D. The length L1 is, for example, 1.2 mm. The length L2 is, for example, 0.9 mm. When the lengths L1 and L2 are set to be short, it is possible to reduce the size of the power storage module 4. However, there is a concern that it may be impossible to ensure the strength of the secondary sealing body 22. There is also a concern that the secondary sealing body 22 may be poorly formed as described below. Therefore, the lengths L1 and L2 can be set in consideration of the above-described facts. The length L1 may be equal to the length L2. The length of the secondary sealing body 22 in the laminating direction D is, for example, 12 mm. The length between an outer edge and an inner edge of the overhang part 23b or 24b is, for example, 5 mm. The outer edges of the overhang parts 23b and 24b overlap an interface S between the primary sealing body 21 and the side surface part 23a when seen in the laminating direction D.

An internal space V regulated by the interval between the primary sealing bodies 21 and 21 in the laminating direction D is formed between the electrode plates 15 and 15. The internal spaces V accommodate an electrolytic solution E formed of, for example, an alkali solution such as an aqueous potassium hydroxide solution. The electrolytic solution E is caused to impregnate the separator 13, the positive electrode 16, and the negative electrode 17. In the sealing body 12, a plurality of communication holes (not shown) communicating with the respective internal spaces V is provided. These communication holes function as a liquid injection port for injecting the electrolytic solution E into the respective internal spaces V. After the injection of the electrolytic solution E, the communication holes function as a connection port of a pressure adjustment valve (not shown).

Next, a method for manufacturing the above-described power storage module 4 will be described. In the method for manufacturing the power storage module 4, first, the primary sealing bodies 21 are formed at the edge portions 15c of the electrode plates 15 of the bipolar electrodes 14, the negative electrode terminal electrode 18, and the positive electrode terminal electrode 19. The primary sealing bodies 21 are formed at the edge portions 15c on the first surface 15a side of the respective electrode plates 15. The primary sealing body 21 is, for example, formed in a rectangular frame shape in advance by injection molding and then attached to the edge portion 15c by welding using ultrasonic waves or heat.

Subsequently, the plurality of bipolar electrodes 14, the negative electrode terminal electrode 18, and the positive electrode terminal electrode 19 including the primary sealing bodies 21 formed at the edge portions 15c are laminated together with the separator 13 therebetween, thereby forming the electrode laminate 11 (electrode laminate-forming step). In this step, first, the primary sealing body 21—attached positive electrode terminal electrode 19 is placed on a lamination jig (not shown). Next, a plurality of the primary sealing body 21—attached bipolar electrodes 14 is laminated on the positive electrode terminal electrode 19 with the separator 13 therebetween. Finally, the primary sealing body 21—attached negative electrode terminal electrode 18 is laminated on the bipolar electrode 14 with the separator 13 therebetween. As a result, the electrode laminate 11 is formed.

Subsequently, the secondary sealing body 22 that bonds the group H of the primary sealing bodies 21 is formed by the injection molding of the resin (secondary sealing body-forming step). In this step, first, the first resin portion 23 is formed along the side surface 11a (first resin portion-forming step). Subsequently, the second resin portion 24 covering the first resin portion 23 is formed (second resin portion-forming step).

Figure 3:
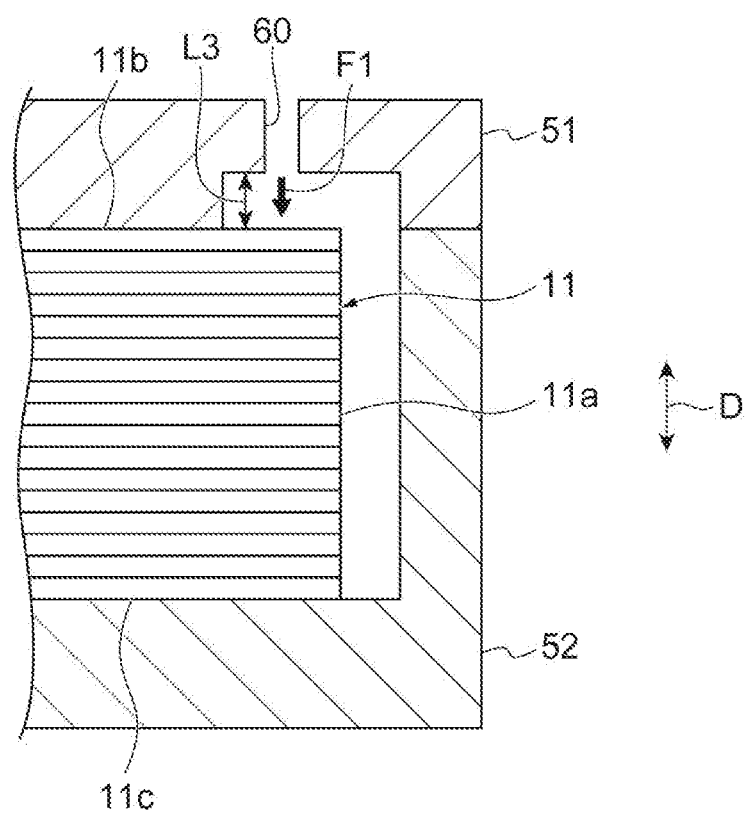
FIG. 3 is a view for describing a first resin portion-forming step according to the embodiment.

FIG. 3 is a view for describing the first resin portion-forming step according to the embodiment. As shown in FIG. 3, in the first resin portion-forming step, using a pair of molds 51 and 52 configured to be capable of brought into contact and separating from each other in the laminating direction D, the side surface part 23a (refer to FIG. 2) is formed along the side surface 11a, and the overhang part 23b overhanging the end surface 11b from the side surface part 23a (refer to FIG. 2) is formed. In the inside of the pair of molds 51 and 52 in a state of being in contact with each other (die-closed state), a space for disposing the electrode laminate 11 in a state of being provided with the primary sealing bodies 21 (not shown in FIG. 3; refer to FIG. 2) and a space for forming the first resin portion 23 are provided.

The electrode laminate 11 is disposed such that the end surface 11b, except for the edge portion, is pressed against the mold 51 and all of the end surface 11c is pressed against the mold 52. To the electrode laminate 11, a compressive force is imparted in the laminating direction D by the pair of molds 51 and 52. In this state, the resin forming the first resin portion 23 is injected into the inside of the pair of molds 51 and 52 in a molten state from an injection port 60 provided to face the edge portion of the end surface 11b. Therefore, a resin flow F1 of the resin forming the first resin portion 23 is pressed against the edge portion of the end surface 11b. Therefore, the first resin portion 23 is formed in a state in which the electrode plate 15 (refer to FIG. 2) being lifted up by the resin flow F1 is prevented, and the group H of the primary sealing bodies 21 (refer to FIG. 2) is bonded by the first resin portion 23.

Figure 4:
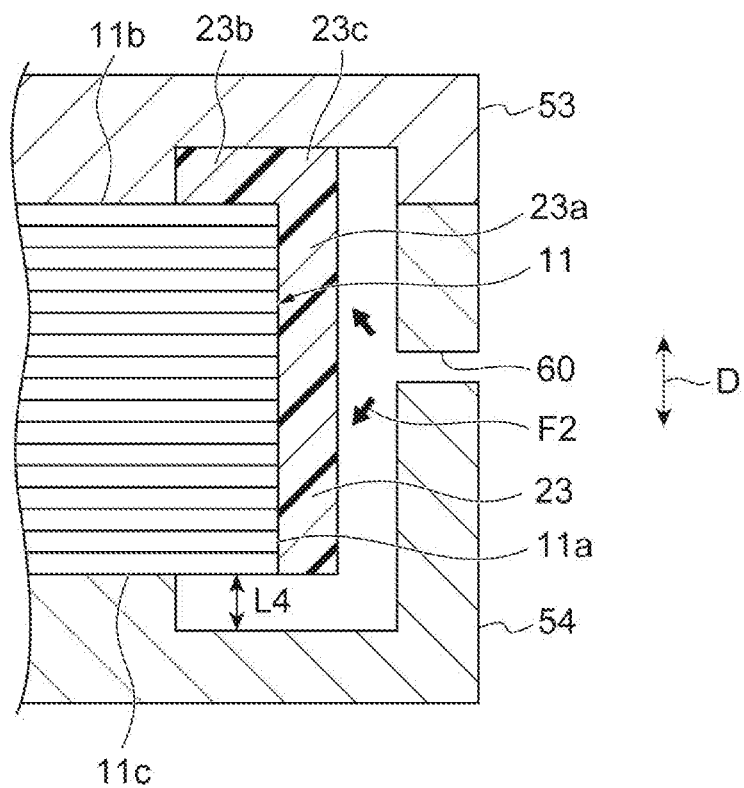
FIG. 4 is a view for describing a second resin portion-forming step according to the embodiment.

FIG. 4 is a view for describing the second resin portion-forming step according to the embodiment. As shown in FIG. 4, in the second resin portion-forming step, using a pair of molds 53 and 54 configured to be capable of brought into contact and separating from each other in the laminating direction D, the side surface part 24a is formed along the side surface part 23a, and the overhang part 24b overhanging the end surface 11c from the side surface part 24a is formed. In the inside of the pair of molds 53 and 54 in a state of being in contact with each other (die-closed state), a space for disposing the electrode laminate 11 in a state of being provided with the primary sealing bodies 21 (not shown in FIG. 4; refer to FIG. 2) and the first resin portion 23 and a space for forming the second resin portion 24 are provided. The resin forming the second resin portion 24 is injected into the inside of the pair of molds 53 and 54 in a molten state from the injection port 60 provided to face the side surface 11a. Therefore, the first resin portion 23 is covered with the second resin portion 24. Here, the group H of the primary sealing bodies 21 (refer to FIG. 2) is bonded by the first resin portion 23, and thus the electrode plate 15 (refer to FIG. 2) being lifted up by a resin flow F2 of the resin forming the second resin portion 24 is prevented regardless of the position at which the injection port 60 is provided.

A length L3 in the laminating direction D of the space for forming the overhang part 23b in the inside of the pair of molds 51 and 52 for forming the first resin portion 23 is set in accordance with the length L1. A length L4 in the laminating direction D of the space for forming the overhang part 24b in the inside of the pair of molds 53 and 54 for forming the second resin portion 24 is set in accordance with the length L2. Therefore, the length L3 is longer than the length L4.

Subsequently, a step of injecting the electrolytic solution E into the internal spaces V through the liquid injection port provided in the sealing body 12 is carried out. As a result, the power storage module 4 is manufactured.

Figure 5:
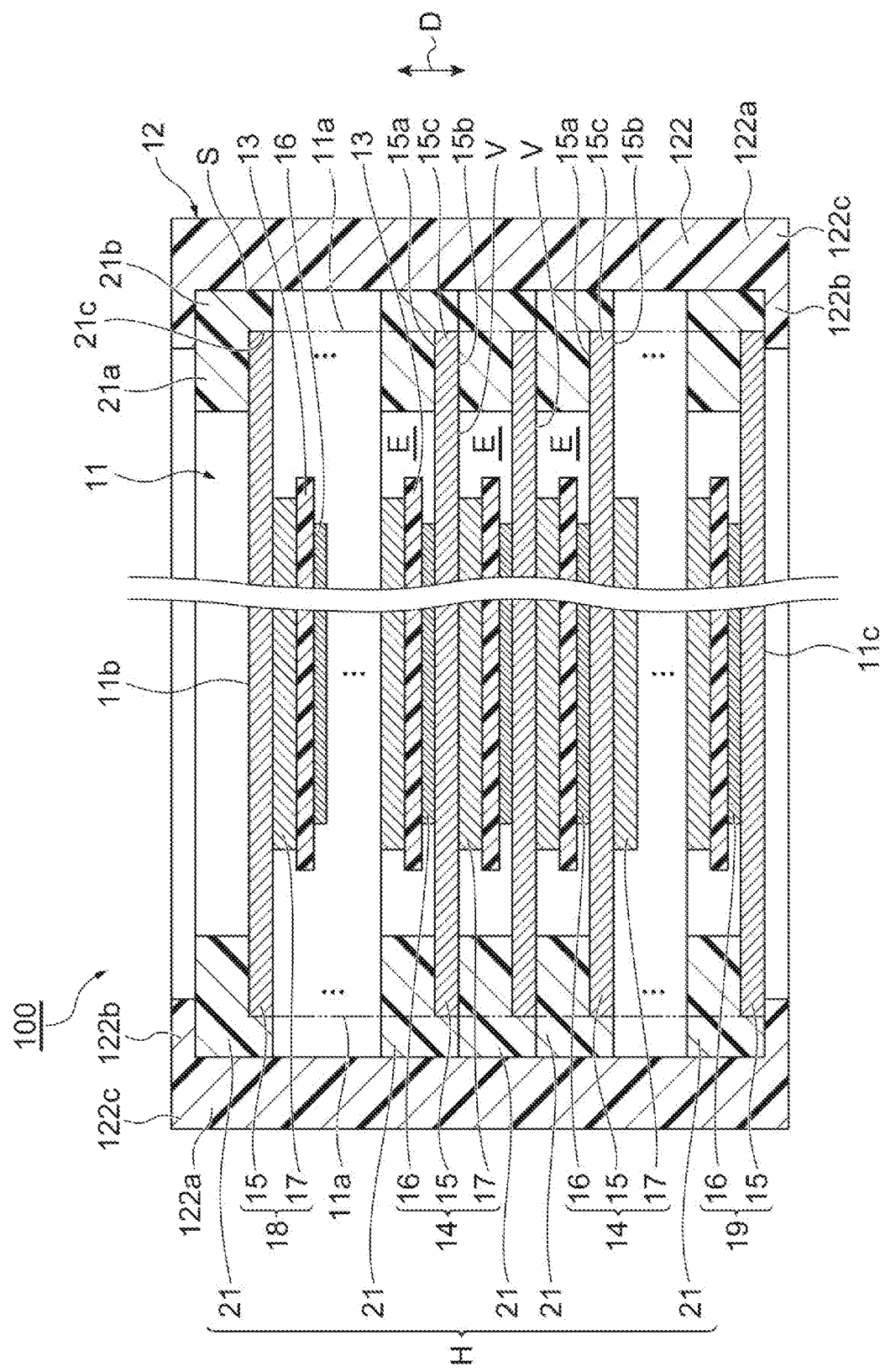
FIG. 5 is a schematic sectional view of a power storage module according to a reference example.

FIG. 5 is a schematic sectional view of the power storage module 4 according to a reference example. As shown in FIG. 5, a power storage module 100 according to the reference example is different from the power storage module 4 shown in FIG. 2 in terms of the fact that, instead of the secondary sealing body 22 in which the first resin portion 23 and the second resin portion 24 are separately formed, the power storage module 100 includes a secondary sealing body 122 in which the above-described resin portions are not separately formed. The secondary sealing body 122 of the power storage module 100 includes a side surface part 122a formed thick and a pair of overhang parts 122b and 122b. The pair of overhang parts 122b and 122b overhang the end surfaces 11b and 11c from a pair of end portions 122c and 122c of the side surface part 23a in the laminating direction D.

The side surface part 122a of the power storage module 100 is thick, and thus, in a case where the side surface part is formed by injection molding, the cooling rate after the injection molding is uneven. A resin is easily cooled in the vicinity of a mold having a high thermal conductivity, but is not easily cooled in the vicinity of the primary sealing body 21 having a low thermal conductivity. The resin shrinks when the resin is cooled from a molten state and is transited to a solidified state. Therefore, due to shrinkage, the resin transited to a solidified state earlier in the vicinity of the mold pulls the resin in a molten state in the vicinity of the primary sealing body 21. As a result, there is a case where voids are formed in the interface S between the primary sealing body 21 and the side surface part 122a. In this case, it is not possible to bond the primary sealing bodies 21 to each other by the secondary sealing body 122, and there is a concern that the sealing property may degrade.

In contrast, in the power storage module 4, the secondary sealing body 22 is provided along the side surface 11a of the electrode laminate 11 and includes not only the first resin portion 23 that bonds the group H of the primary sealing bodies 21 but also the second resin portion 24. Therefore, it is possible to thin the thickness t1 of the first resin portion 23 while ensuring the strength of the secondary sealing body 22. This prevents unevenness in cooling rate after the resin forming the first resin portion 23 has been injection molded. As a result, the formation of voids in the interface S between the primary sealing body 21 and the side surface part 23a is prevented, and it is possible to bond the primary sealing bodies 21 to each other by the secondary sealing body 22. Therefore, it is possible to improve the sealing property. The thickness t1 can be set so that voids are not formed in the interface S.

The first resin portion 23 includes the side surface part 23a and the overhang part 23b overhanging the end surface 11b of the electrode laminate 11, and the second resin portion 24 includes the side surface part 24a and the overhang part 24b overhanging the end surface 11c of the electrode laminate 11. Therefore, when the first resin portion 23 is formed by, for example, injection molding, the molds 51 and 52 are pressed against all of the end surface 11c and all but the edge portion of the one end surface 11b. Furthermore, a melted resin is injected into the inside of the molds 51 and 52 from the end surface 11b side, and the resin flow F1 is pressed against the edge portion of the end surface 11b. Therefore, it is possible to impart a compressive force in the laminating direction D to the edge portion of the electrode laminate 11. Therefore, the bipolar electrodes 14 being lifted up by the resin flow F1 is prevented. As a result, it is possible to further improve the sealing property.

Figure 6:
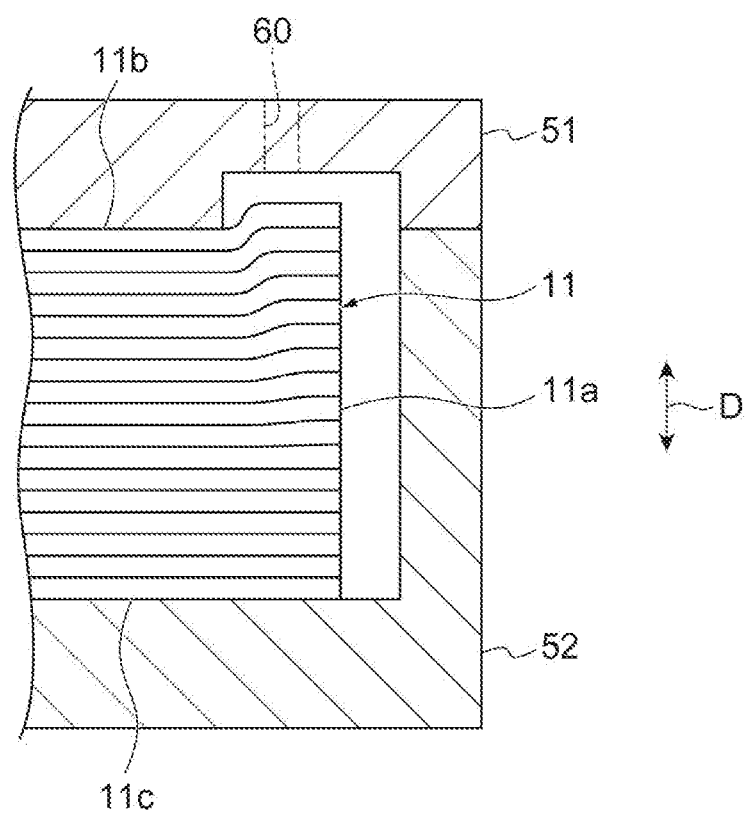
FIG. 6 is a view for describing the first resin portion-forming step according to the embodiment.

In the forming step of the first resin portion 23, it is possible to impart a compressive force in the laminating direction D to the electrode laminate 11 using the pair of molds 51 and 52. However, it is not possible to impart a compressive force to the edge portion of the electrode laminate 11. Therefore, the edge portion of the electrode laminate 11 is not compressed, and, there is a case where the edge portion intrudes into the inside of the space for forming the overhang part 23b in the pair of molds 51 and 52 as shown in FIG. 6. In this case, the space for forming the overhang part 23b is narrowed, and, as a result, there is a concern that the resin may not be delivered to the inside of the pair of molds 51 and 52 and the first resin portion 23 may be poorly formed.

Particularly, in a position apart from the injection port 60, the space for forming the overhang part 23b is likely to be narrowed. This is because, in the vicinity of the injection port 60, the edge portion of the electrode laminate 11 is pressed and compressed by the resin flow F1 as shown in FIG. 3; however, in the position apart from the injection port 60, the edge portion of the electrode laminate 11 is not compressed as shown in FIG. 6, and the resin easily intrudes into the space for forming the overhang part 23b.

In the forming step of the second resin portion 24, the group H of the primary sealing bodies 21 is already bonded by the first resin portion 23. Therefore, the intrusion of the edge portion of the electrode laminate 11 into the space for forming the overhang part 24b in the pair of molds 53 and 54 is prevented. Therefore, the second resin portion 24 being poorly formed is prevented.

In the present embodiment, the length L1 is longer than the length L2. Therefore, it is possible to set the length L3 of the space for forming the overhang part 23b to be longer than the length L4 of the space for forming the overhang part 24b. Therefore, the space for forming the overhang part 23b being narrowed is prevented, and thus the resin is delivered to the inside of the pair of molds 51 and 52. Therefore, the first resin portion 23 being poorly formed can be prevented.

The resin forming the first resin portion 23 is the same as the resin forming the second resin portion 24. Therefore, the first resin portion 23 and the second resin portion 24 are easily bonded to each other. Therefore, it is possible to improve the strength of the sealing body 12.

In a method for manufacturing the power storage module 100, a secondary sealing body-forming step is carried out in a state in which the edge portions of the end surfaces 11b and 11c are all not pressed. Therefore, there is a concern that the electrode plates 15 may be lifted up by the resin flow of the resin forming the secondary sealing body 122. Particularly, when the resin flow travels from the space for forming the side surface part 122a toward the space for forming the overhang part 122b in the molds, the edge portions of the electrode plates 15 are likely to be lifted up.

In contrast, in the method for manufacturing the power storage module 4, in the secondary sealing body-forming step, the first resin portion 23 that bonds the group H of the primary sealing bodies 21 is not only formed along the side surface 11a of the electrode laminate 11, but the second resin portion 24 is also formed. Therefore, it is possible to thin the thickness t1 of the first resin portion 23 while ensuring the strength of the secondary sealing body 22. This prevents unevenness in cooling rate after the resin forming the first resin portion 23 has been injection molded. As a result, the formation of voids in the interface S between the primary sealing body 21 and the first resin portion 23 is prevented, and it is possible to bond the primary sealing bodies 21 to each other by the first resin portion 23. Therefore, it is possible to improve the sealing property.

In the first resin portion-forming step, the side surface part 23a is formed, and the overhang part 23b overhanging the end surface 11b of the electrode laminate 11 is formed. In the second resin portion-forming step, the side surface part 24a is formed, and the overhang part 24b overhanging the end surface 11c of the electrode laminate 11 is formed. Therefore, in the first resin portion-forming step, the mold 52 is pressed against all of the end surface 11c and all but the edge portion of the end surface 11b. Furthermore, a melted resin is injected into the inside of the molds 51 and 52 from the end surface 11b side, and the resin flow F1 is pressed against the edge portion of the end surface 11b. Therefore, it is possible to impart a compressive force in the laminating direction D to the edge portion of the electrode laminate 11. Therefore, the bipolar electrode 14 being lifted up by the resin flow F1 is prevented. As a result, it is possible to further improve the sealing property.

The present invention is not limited to the above-described embodiment, and various modifications can be made.

Figure 7:
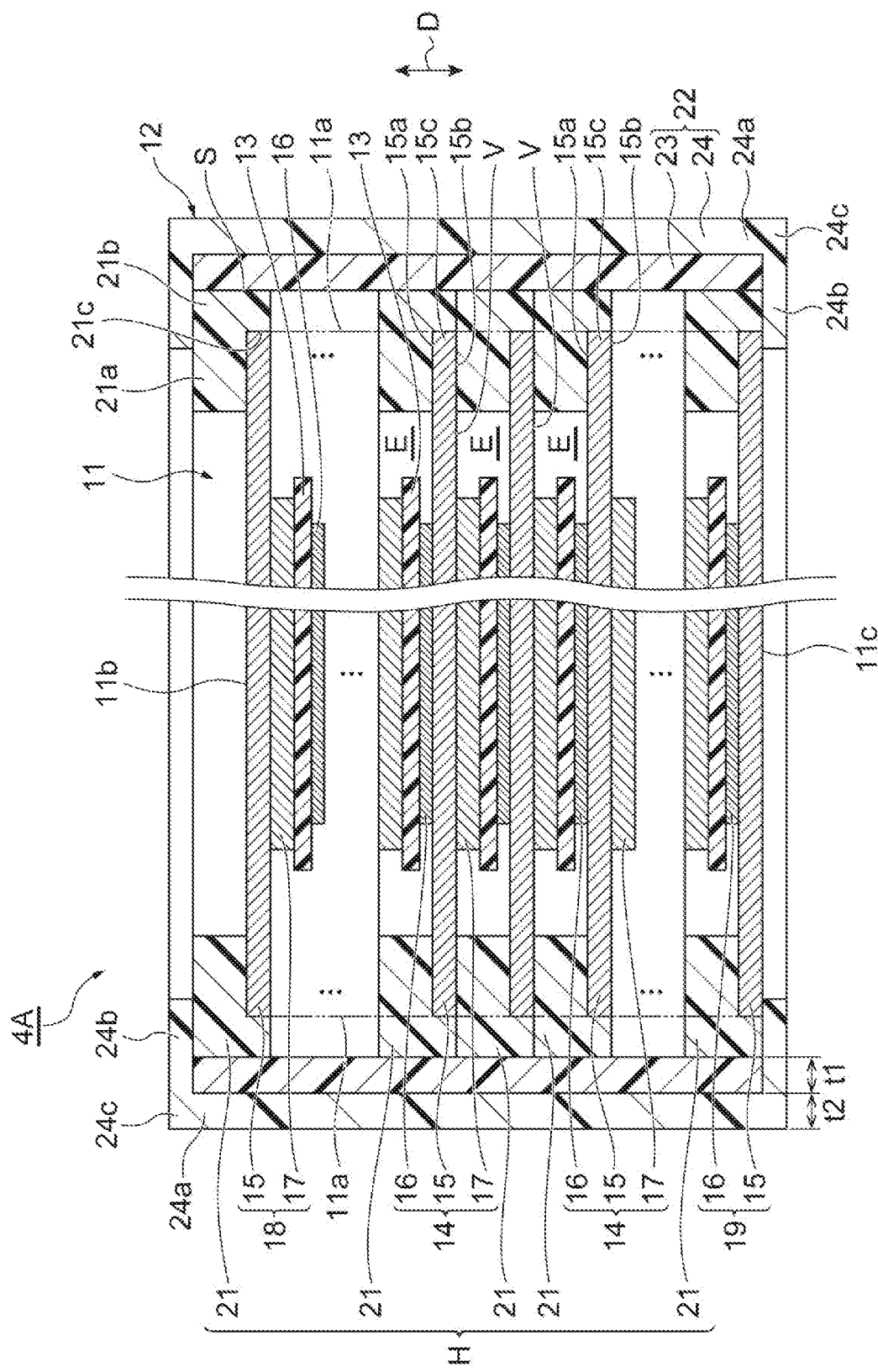
FIG. 7 is a schematic sectional view of a power storage module according to a first modification example.

FIG. 7 is a schematic sectional view of a power storage module according to a first modification example. As shown in FIG. 7, a power storage module 4A according to the first modification example is different from the power storage module 4 shown in FIG. 2 in terms of the fact that the first resin portion 23 does not include the overhang part 23b (refer to FIG. 2) and the second resin portion 24 includes a pair of overhang parts 24b and 24b. That is, in the power storage module 4A, substantially, all of the first resin portion 23 corresponds to the side surface part 23a (refer to FIG. 2). The second resin portion 24 includes the side surface part 24a provided along the first resin portion 23 and the pair of overhang parts 24b and 24b. The pair of overhang parts 24b and 24b overhang the end surfaces 11b and 11c from a pair of end portions 24c and 24c of the side surface part 24a in the laminating direction D.

In the above-described power storage module 4A as well, the secondary sealing body 22 is provided along the side surface 11a of the electrode laminate 11 and includes not only the first resin portion 23 that bonds the group H of the primary sealing bodies 21 but also the second resin portion 24. Therefore, similar to the power storage module 4, it is possible to improve the sealing property while ensuring the strength of the secondary sealing body 22.

In the power storage module 4A, the second resin portion 24 includes the side surface part 24a and the pair of overhang parts 24b and 24b. Therefore, at the time of forming the first resin portion 23, it is possible to injection-mold the resin in a state in which, for example, the molds are pressed against the end surfaces 11b and 11c and a compressive force in the laminating direction D is imparted to the electrode laminate 11. Therefore, the bipolar electrode 14 being lifted up by the resin flow F1 is prevented. As a result, it is possible to further improve the sealing property.

Figure 8:
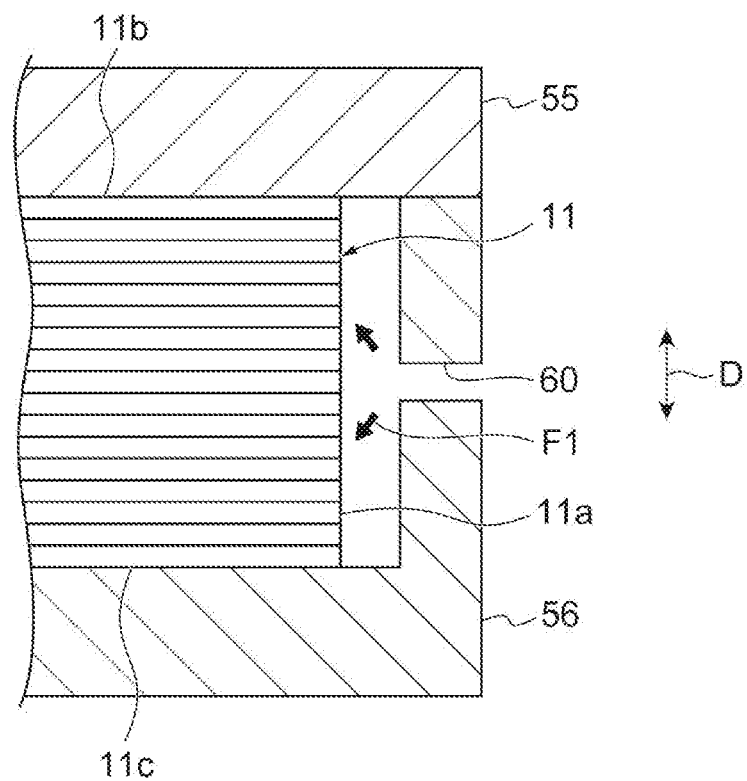
FIG. 8 is a view for describing a first resin portion-forming step according to the first modification example.

FIG. 8 is a view for describing a first resin portion-forming step according to the first modification example. As shown in FIG. 8, in the first resin portion-forming step of a method for manufacturing the power storage module 4A, using a pair of molds 55 and 56 configured to be capable of brought into contact and separating from each other in the laminating direction D, the first resin portion 23 (refer to FIG. 7) is formed along the side surface 11a. In the inside of the pair of molds 55 and 56 in a state of being in contact with each other (die-closed state), a space for disposing the electrode laminate 11 in a state of being provided with the primary sealing bodies 21 (not shown in FIG. 8; refer to FIG. 7) and a space for forming the first resin portion 23 are provided.

The electrode laminate 11 is disposed such that all of the end surfaces 11b and 11c are pressed against the molds 55 and 56. To the electrode laminate 11, a compressive force is imparted in the laminating direction D by the pair of molds 55 and 56. In this state, the resin forming the first resin portion 23 is injected into the inside of the pair of molds 55 and 56 in a molten state from an injection port 60 provided to face, for example, the side surface 11a. Therefore, the first resin portion 23 is formed in a state in which the electrode plate 15 being lifted up is prevented, and the group H of the primary sealing bodies 21 (refer to FIG. 2) is bonded by the first resin portion 23.

Figure 9:
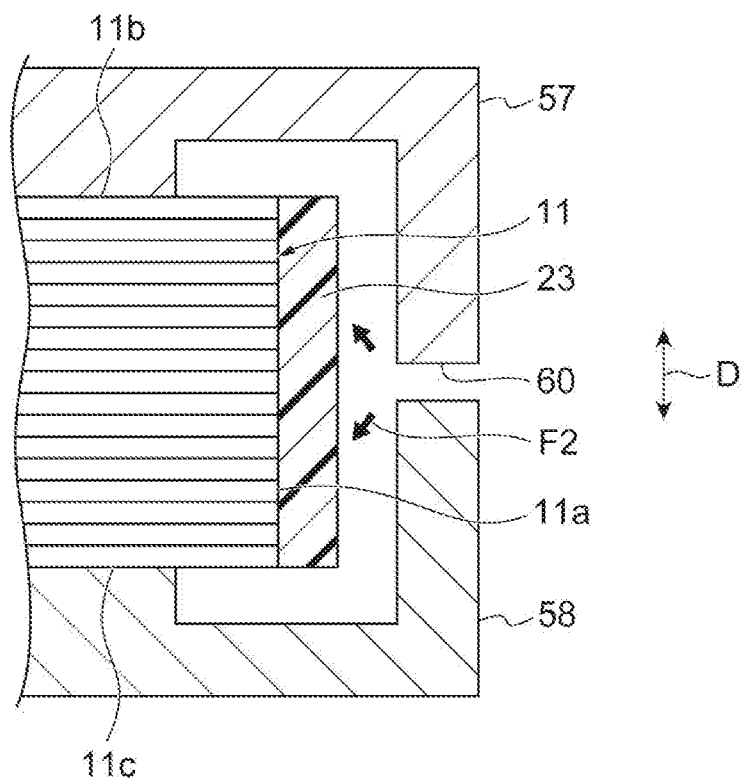
FIG. 9 is a view for describing a second resin portion-forming step according to the first modification example.

FIG. 9 is a view for describing a second resin portion-forming step according to the first modification example. As shown in FIG. 9, in the second resin portion-forming step of a method for manufacturing the power storage module 4A, using a pair of molds 57 and 58 configured to be capable of brought into contact and separating from each other in the laminating direction D, the side surface part 24a is formed along the first resin portion 23, and the overhang parts 24b and 24b overhanging the end surfaces 11b and 11c from the side surface part 24a is formed. In the inside of the pair of molds 57 and 58 in a state of being in contact with each other (die-closed state), a space for disposing the electrode laminate 11 in a state of being provided with the primary sealing bodies 21 (not shown in FIG. 9; refer to FIG. 7) and the first resin portion 23 and a space for forming the second resin portion 24 (refer to FIG. 7) are provided. The resin forming the second resin portion 24 is injected into the inside of the pair of molds 57 and 58 in a molten state from the injection port 60 provided to face the side surface 11a. Therefore, the first resin portion 23 is covered with the second resin portion 24. In the second resin portion-forming step according to the first modification example as well, the group H of the primary sealing bodies 21 (refer to FIG. 7) is bonded by the first resin portion 23, and thus there is no concern that the electrode plates 15 may be lifted up by the resin flow F2 of the resin forming the second resin portion 24.

Subsequently, a step of injecting the electrolytic solution E into the internal spaces V through the liquid injection port provided in the sealing body 12 is carried out. As a result, the power storage module 4A is manufactured.

In the above-described method for manufacturing the power storage module 4A as well, in the secondary sealing body-forming step, the first resin portion 23 is formed, and the second resin portion 24 is also formed. Therefore, similar to the power storage module 4, it is possible to improve the sealing property while ensuring the strength of the secondary sealing body 22.

In the second resin portion-forming step, the side surface part 24a is formed, and the pair of overhang parts 24b and 24b are formed. Therefore, in the first resin portion-forming step, it is possible to carry out the injection molding of the resin in a state in which the molds 55 and 56 are pressed against, for example, all of the end surfaces 11b and 11c. Therefore, the electrode plate 15 being lifted up by the resin flow F1 is prevented. As a result, it is possible to further improve the sealing property.

Figure 10:
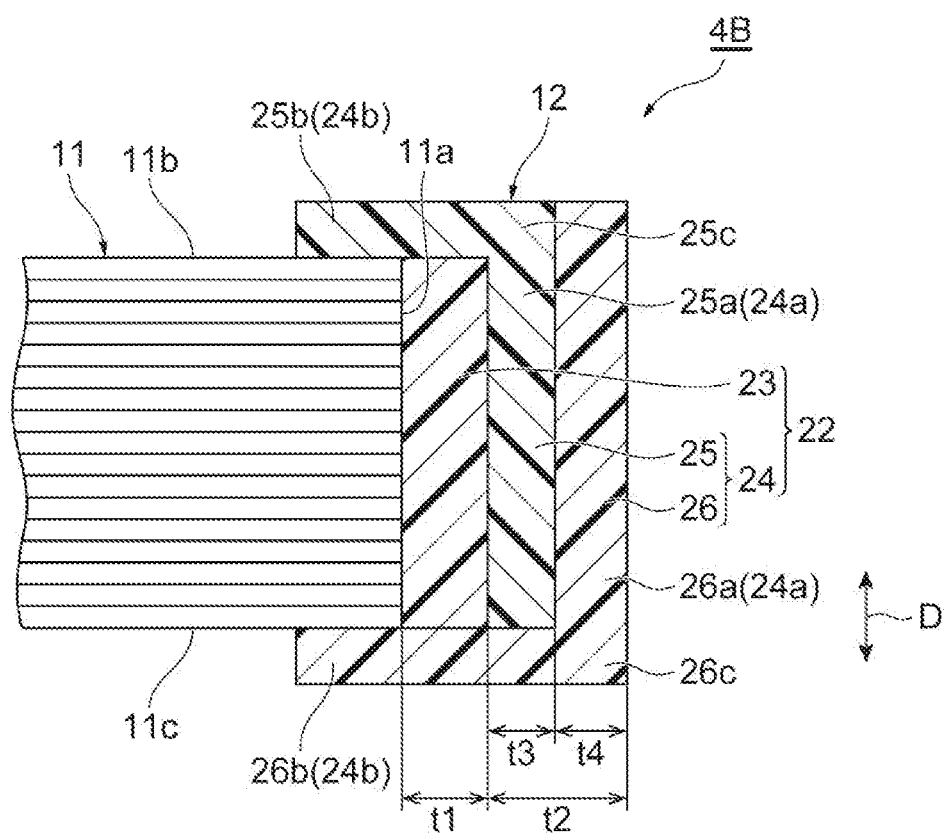
FIG. 10 is a schematic sectional view of a power storage module according to a second modification example.

FIG. 10 is a schematic sectional view of a power storage module according to a second modification example. As shown in FIG. 10, a power storage module 4B according to the second modification example is different from the power storage module 4A shown in FIG. 7 in terms of the fact that the second resin portion 24 includes a first part 25 and a second part 26. In FIG. 10, the electrode laminate 11 is simply shown, and the primary sealing body 21 is not shown. The first part 25 covers the first resin portion 23. The first part 25 includes a side surface part 25a and an overhang part 25b. The side surface part 25a is provided along the first resin portion 23 and covers the first resin portion 23. The overhang part 25b overhangs the end surface 11b from an end portion 25c of the side surface part 25a in the laminating direction D. The overhang part 25b is continuously provided throughout the entire side of the electrode plate 15 (refer to FIG. 7). A resin forming the first part 25 is a resin compatible with a resin forming the first resin portion 23 and the second part 26 and is, for example, the same as the resin forming the first resin portion 23 and the second part 26.

The second part 26 covers the first part 25. The second part 26 includes a side surface part 26a and an overhang part 26b. The side surface part 26a is provided along the side surface part 25a and covers the side surface part 25a. The overhang part 26b overhangs the end surface 11c from an end portion 26c of the side surface part 26a in the laminating direction D. The overhang part 26b is continuously provided throughout the entire side of the electrode plate 15 (refer to FIG. 7). The side surface parts 25a and 26a configure the side surface part 24a. The overhang parts 25b and 26b configure the overhang part 24b. The sum of a thickness t3 of the side surface part 25a and a thickness t4 of the side surface part 26a is the thickness t2. For example, the thickness t3 and the thickness t4 may be equal to each other, and the thickness t3 and the thickness t4 may be 1.5 mm or less.

In the above-described power storage module 4B, the secondary sealing body 22 includes not only the first resin portion 23 but also the second resin portion 24. Therefore, similar to the power storage modules 4 and 4A, it is possible to improve the sealing property while ensuring the strength of the secondary sealing body 22. The second resin portion 24 includes the side surface part 24a and the pair of overhang parts 24b. Therefore, at the time of forming the first resin portion 23, it is possible to injection-mold the resin in a state in which, for example, the molds are pressed against the end surfaces 11b and 11c and a compressive force in the laminating direction D is imparted to the electrode laminate 11. Therefore, the bipolar electrode 14 being lifted up by the resin flow F1 (refer to FIG. 8) is prevented. As a result, it is possible to further improve the sealing property.

A method for manufacturing the power storage module 4B according to the second modification example is different from the method for manufacturing the power storage module 4A in terms of the fact that the second resin portion-forming step includes a first part-forming step of forming the first part 25 and a second part-forming step of forming the second part 26.

Figure 11:
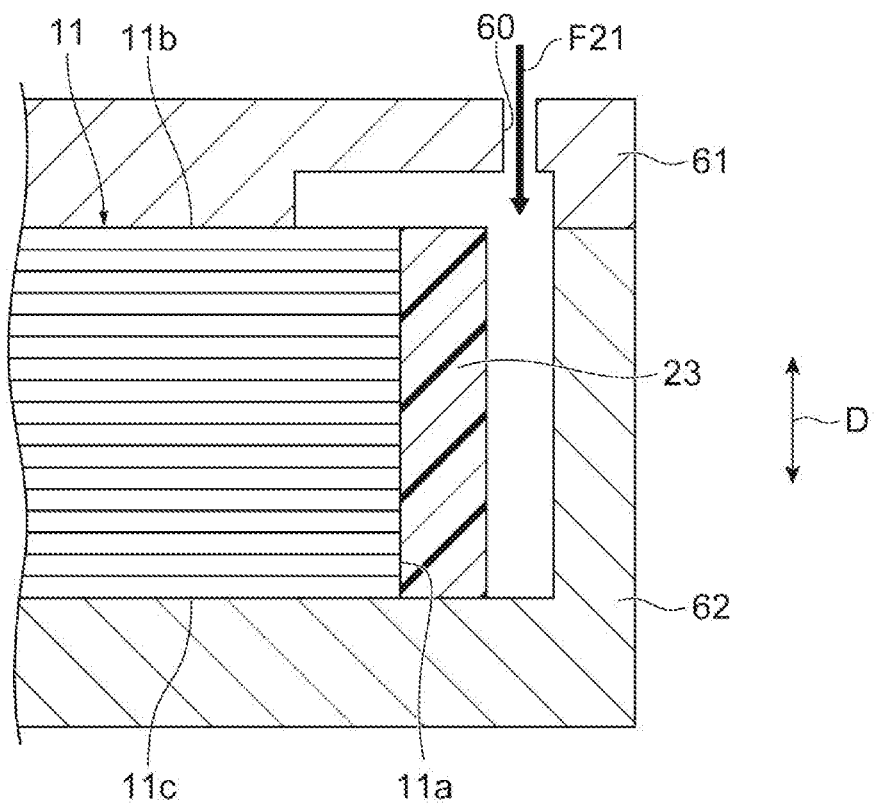
FIG. 11 is a view for describing a first part-forming step according to the second modification example.

FIG. 11 is a view for describing a first part-forming step according to the second modification example. As shown in FIG. 11, in the first part-forming step of the power storage module 4B, using a pair of molds 61 and 62 configured to be capable of brought into contact and separating from each other in the laminating direction D, the side surface part 25a (refer to FIG. 10) is formed along the first resin portion 23, and the overhang part 25b overhanging the end surface 11b from the side surface part 25a (refer to FIG. 10) is formed. In the inside of the pair of molds 61 and 62 in a state of being in contact with each other (die-closed state), a space for disposing the electrode laminate 11 in a state of being provided with the primary sealing bodies 21 (not shown in FIG. 11; refer to FIG. 7) and the first resin portion 23 and a space for forming the first part 25 (refer to FIG. 10) of the second resin portion 24 are provided.

The electrode laminate 11 is disposed such that the end surface 11b, except for the edge portion, is pressed against the mold 61 and all of the end surface 11c is pressed against the mold 62. In this state, the resin forming the first part 25 (refer to FIG. 10) is injected into the inside of the pair of molds 61 and 62 in a molten state from the injection port 60 provided in the mold 61. The injection port 60 is provided to face the mold 62 through the space for forming the side surface part 25a (refer to FIG. 10) of the first part 25. Here, the group H of the primary sealing bodies 21 (refer to FIG. 7) is bonded by the first resin portion 23, and thus the electrode plate 15 (refer to FIG. 7) being lifted up by a resin flow F21 of the resin forming the first part 25 is prevented regardless of the position at which the injection port 60 is provided.

Figure 12:
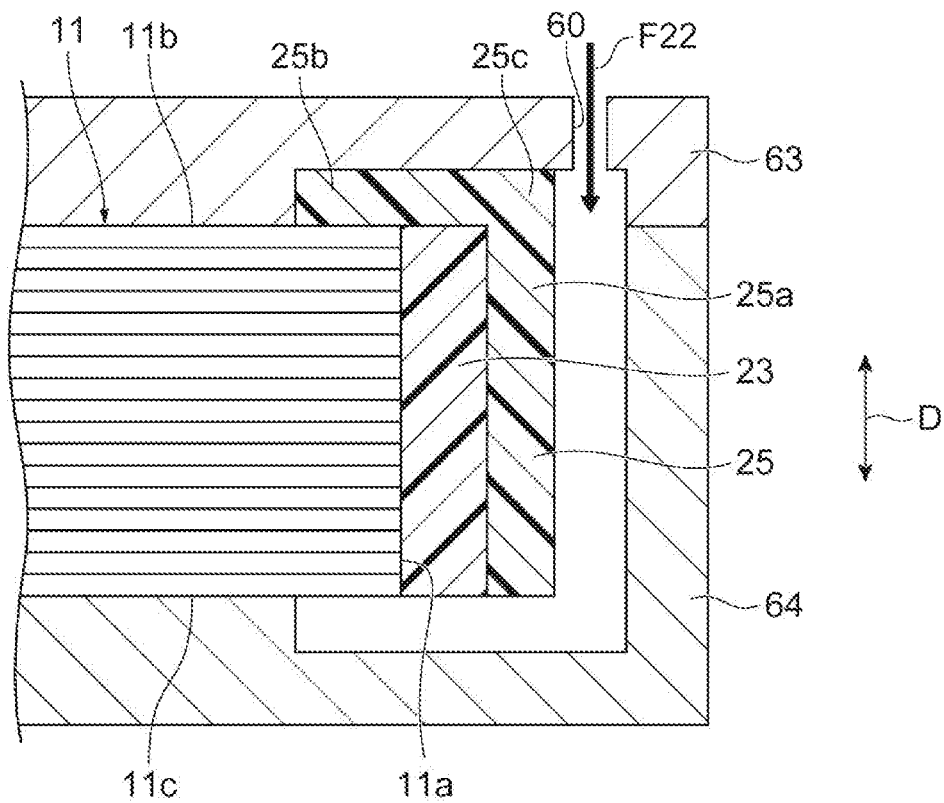
FIG. 12 is a view for describing a second part-forming step according to the second modification example.

FIG. 12 is a view for describing a second part-forming step according to the second modification example. As shown in FIG. 12, in the second part-forming step of the power storage module 4B, using a pair of molds 63 and 64 configured to be capable of brought into contact and separating from each other in the laminating direction D, the side surface part 26a (refer to FIG. 10) is formed along the side surface part 25a, and the overhang part 26b overhanging the end surface 11c from the side surface part 26a (refer to FIG. 10) is formed. In the inside of the pair of molds 63 and 64 in a state of being in contact with each other (die-closed state), a space for disposing the electrode laminate 11 in a state of being provided with the primary sealing bodies 21 (not shown in FIG. 11; refer to FIG. 7), the first resin portion 23, and the first part 25 and a space for forming the second part 26 (refer to FIG. 10) of the second resin portion 24 are provided.

The electrode laminate 11 is disposed such that all of the end surface 11b is pressed against the mold 63 and all but the end portion of the end surface 11c is pressed against the mold 64. The end portion of the end surface 11b is pressed against the mold 63 through the overhang part 25b of the first part 25. In this state, the resin forming the second part 26 (refer to FIG. 10) is injected into the inside of the pair of molds 63 and 64 in a molten state from the injection port 60 provided in the mold 63. The injection port 60 is provided to face the mold 64 through the space for forming the side surface part 26a (refer to FIG. 10) of the second part 26. As described above, the group H of the primary sealing bodies 21 (refer to FIG. 7) is bonded by the first resin portion 23, and thus the electrode plate 15 (refer to FIG. 7) being lifted up by a resin flow F22 of the resin forming the second part 26 is prevented regardless of the position at which the injection port 60 is provided.

In the above-described method for manufacturing the power storage module 4B as well, in the secondary sealing body-forming step, the first resin portion 23 is formed, and the second resin portion 24 is also formed. Therefore, similar to the methods for manufacturing the power storage module 4 or 4A, it is possible to improve the sealing property while ensuring the strength of the secondary sealing body 22. In the second resin portion-forming step, the side surface part 24a is formed, and the pair of overhang parts 24b and 24b are formed. Therefore, similar to the method for manufacturing the power storage module 4B, in the first resin portion-forming step, it is possible to carry out the injection molding of the resin in a state in which a pair of molds are pressed against, for example, all of the end surfaces 11b and 11c. Therefore, it is possible to further improve the sealing property.

In the power storage module 4 according to the embodiment, the overhang part 23b of the first resin portion 23 extends over the end surface 11b, and the overhang part 24b of the second resin portion 24 extends over the end surface 11c, but the overhang part 23b of the first resin portion 23 may extend over the end surface 11c, and the overhang part 24b of the second resin portion 24 may extend over the end surface 11b.

In the power storage modules 4, 4A, and 4B, the thickness t2 is, for example, equal to the thickness t1, but the thickness t2 may be set to be thicker than the thickness t1. In a case where the second resin portion 24 is formed thick by injection molding, there is a possibility that the cooling rate after the injection molding may become uneven and voids may be formed in the interface between the first resin portion 23 and the second resin portion 24, but the portions between the bipolar electrodes 14 are sealed by the first resin portion 23, and thus the sealing property is not affected.

The secondary sealing body 22 may further include one or a plurality of resin portions that covers the second resin portion 24. In this case, the thicknesses of the respective resin portions can be set to be thin, and thus the formation of voids in the interface between the resin portions is prevented. Therefore, the bonding strength between the resin portions improves, and consequently, the strength of the sealing body 12 improves. The power storage module 4B is also a modification example in which the first part 25 is provided as the second resin portion 24 and the second part 26 is provided as the third resin portion.

In the power storage module 4B, the overhang part 25b of the first part 25 extends over the end surface 11b, and the overhang part 26b of the second part 26 extends over the end surface 11c, but the overhang part 25b of the first part 25 may extend over the end surface 11c, and the overhang part 26b of the second part 26 may extend over the end surface 11b. The first part 25 may not include the side surface part 25a, and, substantially, all of the first part 25 may correspond to the overhang part 25b. In this case, the side surface part 26a configures all of the side surface part 24a. The second resin portion 24 may include three or more parts.

REFERENCE SIGNS LIST 4, 4A, 4B: power storage module
11: electrode laminate
11a: side surface
11b, 11c: end surface
12: sealing body
14: bipolar electrode
15: electrode plate
15c: edge portion
21: primary sealing body
22: secondary sealing body
23: first resin portion
23a: side surface part
23b: overhang part
24: second resin portion
24a: side surface part
24b: overhang part
D: laminating direction

The invention claimed is:

1. A power storage module comprising:
an electrode laminate including a plurality of bipolar electrodes which are laminated; and
a sealing body sealing a space between a pair of the bipolar electrodes adjacent to each other in a laminating direction among the plurality of bipolar electrodes in the electrode laminate,
wherein each of the plurality of bipolar electrodes includes an electrode plate,
the sealing body includes a group of primary sealing bodies each provided at an edge portion of the electrode plate of each of the plurality of bipolar electrodes and a secondary sealing body, and
the secondary sealing body includes
a first resin portion that is provided along a side surface of the electrode laminate extending in the laminating direction and bonds the group of primary sealing bodies, and
a second resin portion covering the first resin portion.

2. The power storage module according to claim 1,
wherein the first resin portion includes
a first side surface part that is provided along the side surface and bonds the group of primary sealing bodies, and
a first overhang part overhanging one end surface of the electrode laminate in the laminating direction from the first side surface part, and
the second resin portion includes
a second side surface part provided along the first side surface part, and
a second overhang part overhanging the other end surface of the electrode laminate in the laminating direction from the second side surface part.

3. The power storage module according to claim 2,
wherein a length of the first overhang part in the laminating direction is longer than a length of the second overhang part in the laminating direction.

4. The power storage module according to claim 1,
wherein the second resin portion includes
a side surface part provided along the first resin portion,
a first overhang part overhanging one end surface of the electrode laminate in the laminating direction from the side surface part, and
a second overhang part overhanging the other end surface of the electrode laminate in the laminating direction from the side surface part.

5. The power storage module according to claim 1,
wherein a resin forming the first resin portion is the same as a resin forming the second resin portion.

6. The power storage module according to claim 2,
wherein a resin forming the first resin portion is the same as a resin forming the second resin portion.

7. The power storage module according to claim 3,
wherein a resin forming the first resin portion is the same as a resin forming the second resin portion.

8. The power storage module according to claim 4,
wherein a resin forming the first resin portion is the same as a resin forming the second resin portion.

9. A method for manufacturing a power storage module comprising:
an electrode laminate-forming step of forming an electrode laminate by laminating bipolar electrodes each provided with a primary sealing body at an edge portion; and
a secondary sealing body-forming step of forming a secondary sealing body bonding a group of the primary sealing bodies by injection molding of a resin,
wherein the secondary sealing body-forming step includes
a first resin portion-forming step of forming a first resin portion bonding the group of the primary sealing bodies along a side surface extending in a laminating direction of the electrode laminate and
a second resin portion-forming step of forming a second resin portion covering the first resin portion.

10. The method for manufacturing a power storage module according to claim 9,
wherein, in the first resin portion-forming step, a first side surface part is formed along the side surface, and a first overhang part overhanging one end surface of the electrode laminate in the laminating direction from the first side surface part is formed, and,
in the second resin portion-forming step, a second side surface part is formed along the first side surface part, and a second overhang part overhanging the other end surface of the electrode laminate in the laminating direction from the second side surface part is formed.

11. The method for manufacturing a power storage module according to claim 9,
wherein, in the second resin portion-forming step, a side surface part is formed along the first resin portion, and a first overhang part overhanging one end surface of the electrode laminate in the laminating direction from the side surface part, and a second overhang part overhanging the other end surface of the electrode laminate in the laminating direction from the side surface part are formed.

12. The method for manufacturing a power storage module according to claim 9, wherein the first resin portion-forming step and the second resin portion-forming step include the injection molding of the resin.

* * * * *